US011270720B2

(12) United States Patent
Joglekar et al.

(10) Patent No.: US 11,270,720 B2
(45) Date of Patent: Mar. 8, 2022

(54) BACKGROUND NOISE ESTIMATION AND VOICE ACTIVITY DETECTION SYSTEM

(71) Applicant: TEXAS INSTRUMENTS INCORPORATED, Dallas, TX (US)

(72) Inventors: Aditya Sunil Joglekar, Dallas, TX (US); Charles Kasimer Sestok, IV, Dallas, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/730,546

(22) Filed: Dec. 30, 2019

(65) Prior Publication Data

US 2021/0201936 A1 Jul. 1, 2021

(51) Int. Cl.
*G10L 25/84* (2013.01)
*G10L 25/93* (2013.01)
*G10L 25/21* (2013.01)
*G10L 21/0364* (2013.01)

(52) U.S. Cl.
CPC .......... *G10L 25/84* (2013.01); *G10L 21/0364* (2013.01); *G10L 25/21* (2013.01); *G10L 25/93* (2013.01); *G10L 2025/932* (2013.01)

(58) Field of Classification Search
None
See application file for complete search history.

(56) References Cited

U.S. PATENT DOCUMENTS

| 6,349,278 | B1* | 2/2002 | Krasny | G10L 25/78 704/226 |
|---|---|---|---|---|
| 8,380,500 | B2 | 2/2013 | Yamamoto et al. | |
| 9,123,347 | B2 | 9/2015 | Kim et al. | |
| 2009/0254340 | A1* | 10/2009 | Sun | G10L 21/0208 704/226 |
| 2009/0254341 | A1* | 10/2009 | Yamamoto | G10L 25/78 704/233 |

(Continued)

FOREIGN PATENT DOCUMENTS

| CN | 105513614 B | 5/2019 |
|---|---|---|
| CN | 110289011 a | 9/2019 |
| EP | 1944754 B | 8/2016 |

OTHER PUBLICATIONS

S. Graf, T. Herbig, M. Buck, and G. Schmidt, "Features for Voice Activity Detection: A Comparitive Analysis," Eurasip Journal on Advances in Signal Processing, 2015: 91, DOI 10.1186/s13634-015-0277-z.

(Continued)

*Primary Examiner* — Douglas Godbold
(74) *Attorney, Agent, or Firm* — Valerie M. Davis; Charles A. Brill; Frank D Cimino

(57) ABSTRACT

A method includes selecting a frame of an audio signal. The method further includes determining a first power spectral density (PSD) distribution of the frame. The method further includes generating a first reference PSD distribution indicating an estimate of background noise in the frame based on a non-linear weight, a second reference PSD distribution of a previous frame of the audio signal, and a second PSD distribution of the previous frame. The method further includes determining whether voice activity is detected in the frame based on the first PSD distribution of the frame and the first reference PSD distribution.

25 Claims, 4 Drawing Sheets

(56) References Cited

U.S. PATENT DOCUMENTS

| | | | | |
|---|---|---|---|---|
| 2010/0057453 | A1* | 3/2010 | Valsan | G10L 25/78 |
| | | | | 704/232 |
| 2012/0322511 | A1* | 12/2012 | Fox | H04R 3/005 |
| | | | | 455/570 |
| 2014/0316775 | A1* | 10/2014 | Furuta | G10L 21/0208 |
| | | | | 704/226 |
| 2015/0310857 | A1* | 10/2015 | Habets | G10L 15/14 |
| | | | | 704/240 |
| 2018/0293998 | A1* | 10/2018 | Thiagarajan | G10L 25/84 |

OTHER PUBLICATIONS

L. Huang and C. Yang, "A Novel Approach to Robust Speech Endpoint Detection in Car Environments," Proceedings of IEEE ICASSP, 2000, pp. 1751-1754.

K. Prahallad, "Spectrogram, Cepstrum, and Mel-Frequency Analysis," http://www.speech.cs.cmu.edu/15-492/slides/03_mfcc.pdf.

Yu et al., "Voice activity detection under Rayleigh distribution". Journal of Electronics (China). vol. 26, No. 4, Jul. 2009.

PCT Search Report and Written Opinion dated Apr. 1, 2021.

\* cited by examiner

BACKGROUND NOISE ESTIMATION AND VOICE ACTIVITY DETECTION SYSTEM

BACKGROUND

Speech processing systems are integrated into a variety of electronic devices. For example, many mobile phone devices have virtual assistants that utilize a natural language processing system configured to recognize speech and to perform one or more operations based on the recognized speech. Natural language processing is a relatively computationally expensive process. Accordingly, mobile phone devices (or other devices) that perform natural language processing may exhibit increased power consumption and therefore have reduced battery life as compared to other devices.

In order to reduce computational costs in natural language processing systems, some systems perform a relatively less computationally expensive voice activity detection process on a received sound signal and perform natural language processing on selected portions of the sound signal in which voice activity is detected (if any) rather than on the entire sound signal. Some such voice activity detection processes compare a sample of the sound signal to an estimate of background noise to determine whether voice activity is present in the sample. The estimate of background noise may be based on historical values associated with the sound signal. However, such systems may fail to detect voice activity that occurs following sudden loud noises represented in the sound signal.

SUMMARY

Systems and methods for detecting voice activity using non-linearly updated background noise estimation are disclosed.

A method includes selecting a frame of an audio signal. The method further includes determining a first power spectral density (PSD) distribution of the frame. The method further includes generating a first reference PSD distribution indicating an estimate of background noise in the frame based on a non-linear weight, a second reference PSD distribution of a previous frame of the audio signal, and a second PSD distribution of the previous frame. The method further includes determining whether voice activity is detected in the frame based on the first PSD distribution of the frame and the first reference PSD distribution.

A device includes a processor and a memory storing instructions executable by the processor to select a frame of an audio signal. The instructions are further executable by the processor to determine a first power spectral density (PSD) distribution of the frame. The instructions are further executable by the processor to generate a first reference PSD distribution indicating an estimate of background noise in the frame based on a non-linear weight, a second reference PSD distribution of a previous frame of the audio signal, and a second PSD distribution of the previous frame. The instructions are further executable by the processor to determine whether voice activity is detected in the frame based on the first PSD distribution of the frame and the first reference PSD distribution.

A computer readable storage device stores instructions executable by a processor to select a frame of an audio signal. The instructions are further executable by the processor to determine a first power spectral density (PSD) distribution of the frame. The instructions are further executable by the processor to generate a first reference PSD distribution indicating an estimate of background noise in the frame based on a non-linear weight, a second reference PSD distribution of a previous frame of the audio signal, and a second PSD distribution of the previous frame. The instructions are further executable by the processor to determine whether voice activity is detected in the frame based on the first PSD distribution of the frame and the first reference PSD distribution.

BRIEF DESCRIPTION OF THE DRAWINGS

For a detailed description of various examples, reference will now be made to the accompanying drawings in which.

DETAILED DESCRIPTION

Figure 1:
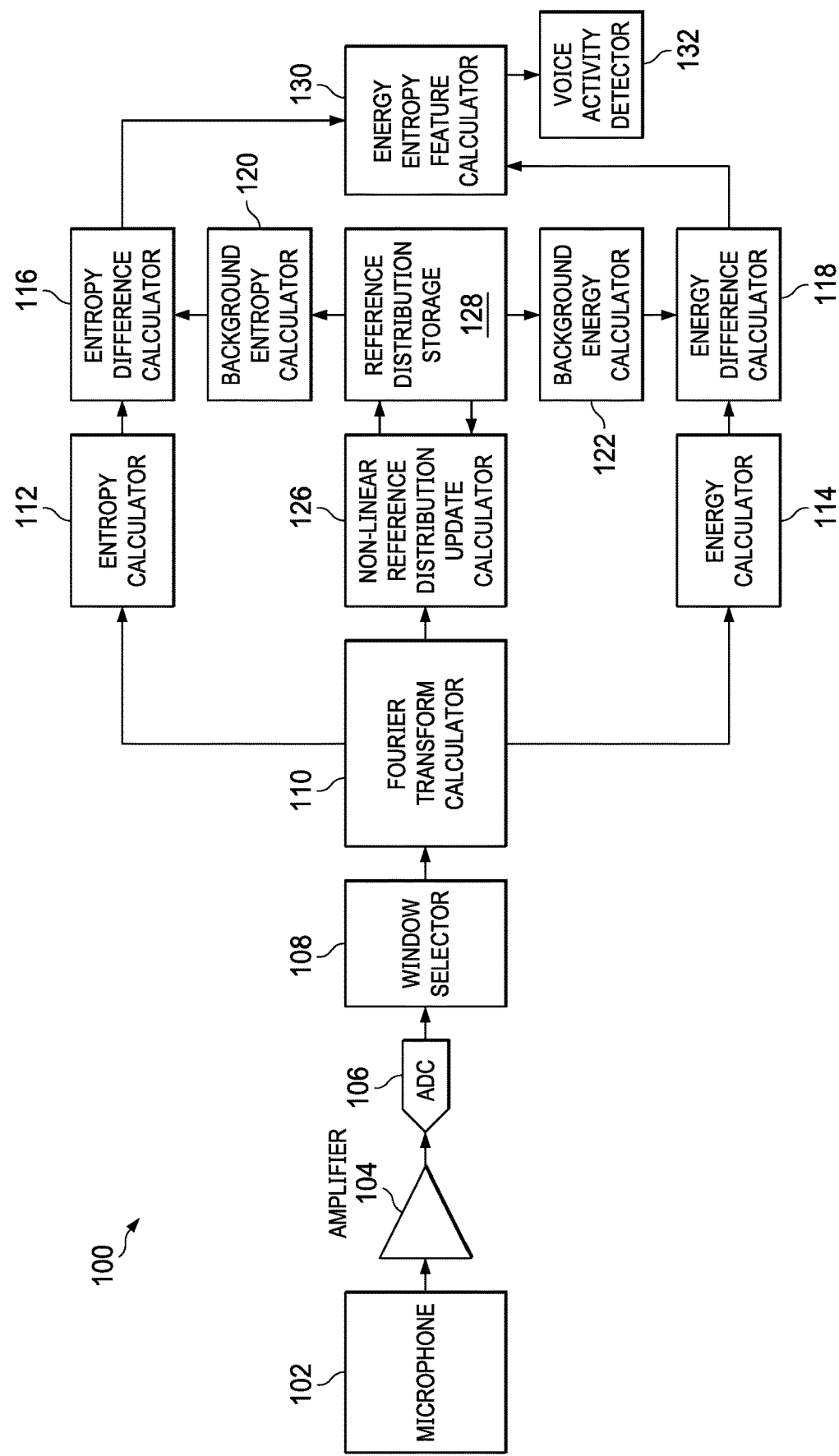
FIG. 1 illustrates an apparatus for performing voice activity detection using a non-linear weighted background noise estimate.

Referring to FIG. 1, a block diagram of an apparatus 100 for performing voice activity detection is shown. The apparatus 100 includes a microphone 102, an amplifier 104, an analog to digital converter (ADC) 106, a window selector 108, a Fourier transform calculator 110, an entropy calculator 112, an energy calculator 114, an entropy difference calculator 116, an energy difference calculator 118, a background entropy calculator 120, a background energy calculator 122, a non-linear reference distribution update calculator 126, a reference distribution storage 128, an energy entropy feature calculator 130, and a voice activity detector 132. The window selector 108, the Fourier transform calculator 110, the entropy calculator 112, the energy calculator 114, the entropy difference calculator 116, the energy difference calculator 118, the background entropy calculator 120, the background energy calculator 122, the non-linear reference distribution update calculator 126, the energy entropy feature calculator 130, and the voice activity detector 132 correspond to specialized hardware, software executed by a processor of the apparatus 100, or a combination thereof.

The microphone 102 may correspond to any type of microphone, including a condenser microphone, a dynamic microphone, a ribbon microphone, a piezo-electric microphone, a micro-electro-mechanical systems (MEMS) microphone, etc. The microphone 102 is configured to generate an electrical signal based on sound waves.

For example, the microphone 102 may generate an electrical signal based on voice activity, background noises, or a combination thereof.

The amplifier 104 may correspond to a programmable gain amplifier or other type of amplifier. The amplifier 104 is configured to receive the electrical signal generated by the microphone and to adjust (e.g., increase) a power of the electrical signal.

The ADC 106 is configured to convert the boosted electrical signal into a digital signal x[n], where n denotes the discrete time sample instance. The ADC 106 may include a delta-sigma modulation ADC or other type of ADC.

The window selector 108 is configured to receive the digital signal x[n] generated by the ADC 106 and to generate frames of the digital signal. In some implementations, the window selector 108 is configured to apply a Hamming window function to select one or more frames (j) from the digital signal. The window selector 108 may correspond to dedicated hardware (e.g., a window selector circuit), to software executed by a processor (not shown) of the apparatus 100, or to a combination thereof. The window selector 108 may generate frames of the signal x[n] according to the formula $x_{w,l}[n]=w[n]x[lB+n]$, where B is a window length n identifies a specific sample from the sequence x[n], w[n] is a list of multiplicative scale factors for a given window sequence (e.g., a Hamming window, a rectangular window, etc.), and l is a frame index. In some implementations, the window selector 108 generates frames at a random rate. Accordingly, the window selector 108 may generate frames that capture repetitive consistently spaced noises that may otherwise fall in between frames.

The Fourier transform calculator 110 is configured to apply a Fourier transform to each frame (l) of the digital signal to convert the frame from the discrete time domain to the discrete frequency domain. In some implementations, the Fourier transform calculator 110 is configured to convert the frames to the frequency domain according to the formula $$X[k, l] = \sum_n x_{w,l}[n]e^{-j\frac{2\pi kn}{N_{FFT}}},$$

where k is a frequency band index, $j=\sqrt{-1}$, $N_{FFT}$ denotes the number of sample points in the Fourier transform (in some implementations $N_{FFT}$ is equal to $2^q$ for some integer q. For example, $N_{FFT}$ may be 256 or 512), and l is a frame index. The Fourier transform calculator 110 is further configured to generate a power spectral density (PSD) distribution for each frame l based on the conversion of the frame to the frequency domain. In a particular example, the Fourier transform calculator 110 is configured to generate the PSD $S(k, l)=X(k, l)X^*(k, l)$ for each frequency band k in each frame l, where the * denotes the complex conjugate operation. Accordingly, for each frame l, the Fourier transform calculator 110 may generate a vector of PSD values. For example, for a frame l, the Fourier transform calculator 110 may generate a PSD distribution $[S_{1,1}, S_{2,1}, \ldots S_{11,1}]$, where $S_{1,1}$ is a PSD value for a first frequency band of the frame l, $S_{2,1}$ is a PSD value for a second frequency band of the frame l, etc.

The entropy calculator 112 is configured to calculate an entropy of each frame (l) based on the PSD distribution S(k, l) of the frame. For example, the entropy calculator 112 may normalize the power spectrum of each frame (l) to generate a probability distribution where each probability value $$P(k, l) = \frac{S(k, l)}{\sum_k S(k, l)}.$$

The entropy calculator 112 may then calculate entropy H of the frame (l), where $H(l)=-\Sigma_k P(k, l) \log_2 P(k, l)$.

The energy calculator 114 is configured to calculate an energy of each frame (l) by integrating the PSD distribution of the frame. For example, for each frame (l), the energy calculator 114 may determine energy (E(l)) according to the equation $E(l)=\Sigma_n x_{w,l}^2[n]=\Sigma_k S(k, l)$.

The background entropy calculator 120 is configured to calculate an entropy value attributable to background noise ($H_{noise}(l)$) for each frame (l) based on a reference PSD distribution $S_{noise}(k, l)$ for the frame (l) stored in the reference distribution storage 128. As described further below, the reference PSD distribution for each frame (l), other than the first frame, is generated by the non-linear reference distribution update calculator 126 based on the PSD distribution of the previous frame (e.g., based on S(k, l−1)). The reference distribution for the first frame may correspond to a zero vector (e.g., [0, . . . , 0]). The background entropy calculator 120 is configured to generate $$P_{noise}(k, l) = \frac{S_{noise}(k, l)}{\sum_k S_{noise}(k, l)}.$$

The background entropy calculator 120 may then calculate background entropy $H_{noise}$ of the frame (l), where $H_{noise}(l) = -\Sigma_k P_{noise}(k, l) \log_2 P_{noise}(k, l)$.

Similarly, the background energy calculator 122 is configured to calculate an energy value attributable to background noise ($E_{noise}(l)$) for each frame (l) based on the reference PSD distribution $S_{Noise}(k, l)$ for the frame (l) stored in the reference distribution storage 128. The background energy calculator 122 is configured to calculate a background energy of each frame (l) by integrating the reference PSD distribution of the frame. For example, for each frame (l), the background energy calculator 122 may determine energy ($E_{noise}(l)$) according to the equation $E_{noise}(l)=\Sigma_n x_{w,l}^2[n]=\Sigma_k S_{noise}(k, l)$.

The non-linear reference distribution update calculator 126 is configured to non-linearly update, for each frame (l), the reference PSD distribution ($S_{noise}(k, l)$) to generate a reference PSD distribution ($S_{noise}(k, l+1)$) for a subsequent frame (l+1) based on the reference PSD distribution ($S_{noise}(k, l)$) for the frame, the PSD distribution for the frame (S(k, l)), and a non-linear weight term. In a particular implementation, the non-linear reference distribution update calculator 126 generates the reference PSD distribution ($S_{noise}(k, l+1)$) for the subsequent frame (l+1) according to the equation $$S_{noise}(k, l+1) = a*S_{noise}(k, l) + (1-a)*\frac{1}{1+D_{KL}(S_{noise}(k, l)\|S(k, l))}*S(k, l),$$

where $D_{KL}(S_{noise}(k, l)\|S(k, l)$ is the Kullback-Leibler divergence between the reference PSD distribution ($S_{noise}(k, l)$) for the frame and the PSD distribution (S(k, l)) for the frame and a is a weight term between 0 and 1. The Kullback-Leibler divergence between probability distributions P(i) and Q(i) is $D_{KL}(P\|Q)=\Sigma_i P(i)\log (P(i)/Q(i))$. This function of the distributions is zero when P(i)=Q(i) for all values of i, and takes on positive values, qualitatively measuring the similarity between the distributions. The Kullback-Leibler divergence weight is applied by the non-linear reference distribution update calculator 126 to any frame used to update background noise estimates.

Because the reference PSD distribution corresponding to a background noise estimate is updated non-linearly based on a PSD distribution of detected sound, the model for background noise used by the apparatus 100 may be less susceptible to sudden and increases in sound of short duration (e.g., a slamming door).

The entropy difference calculator 116 is configured to determine, for each frame (l), an entropy difference ($\Delta H(l)$) by subtracting the noise entropy of the frame from the entropy of the frame according to the equation $\Delta H(l)=|H(l)-H_{noise}(l)|$. Similarly, the energy difference calculator 118 is configured to determine, for each frame (l), an energy difference ($\Delta E(l)$) by subtracting the noise energy of the frame from the energy of the frame according to the equation $\Delta E(l)=|E(l)-E_{noise}(l)|$.

The energy entropy feature calculator 130 is configured to calculate, for each frame (l), an energy entropy feature (F(l)) based on the entropy difference ($\Delta H(l)$) and the energy difference ($\Delta E(l)$) of the frame. For example, the energy entropy feature calculator 130 may calculate the energy entropy feature according to the equation $F(l)=\sqrt{1+|\Delta H(l)\Delta E(l)|}$.

The voice activity detector 132 is configured to compare, for each frame (l), the energy entropy feature (F(l)) to a threshold to determine whether the frame (l) includes voice activity. In response to determining that F(l) satisfies the threshold, the voice activity detector 132 is configured to determine that voice activity is present in the frame (l). In response to determining that the frame (l) does not satisfy the threshold, the voice activity detector 132 is configured to determine that voice activity is not present in the frame (l). The voice activity detector 132 may be configured to determine that values greater than the threshold, less than the threshold, greater than or equal to the threshold, or less than or equal to the threshold satisfy the threshold. The voice activity detector 132 may be configured to initiate one or more actions in response to detecting voice activity in a frame. For example, the voice activity detector 132 may initiate natural language processing of the frame in response to detecting voice activity in the frame.

Thus, the apparatus of FIG. 1 may be used to perform voice activity detection. Because the apparatus 100 updates background noise estimations non-linearly, the apparatus 100 may be less susceptible to sudden noise level changes of short duration as compared to other voice activity detection apparatuses. Further, because the apparatus 100 generates frames for voice activity detection at random intervals, the apparatus 100 may detect evenly spaced noises (e.g., speech) that may otherwise fall between evenly spaced frames. The apparatus 100 may have alternate configurations in other implementations. For example, the components described above may be combined or broken into different combinations.

Figure 2:
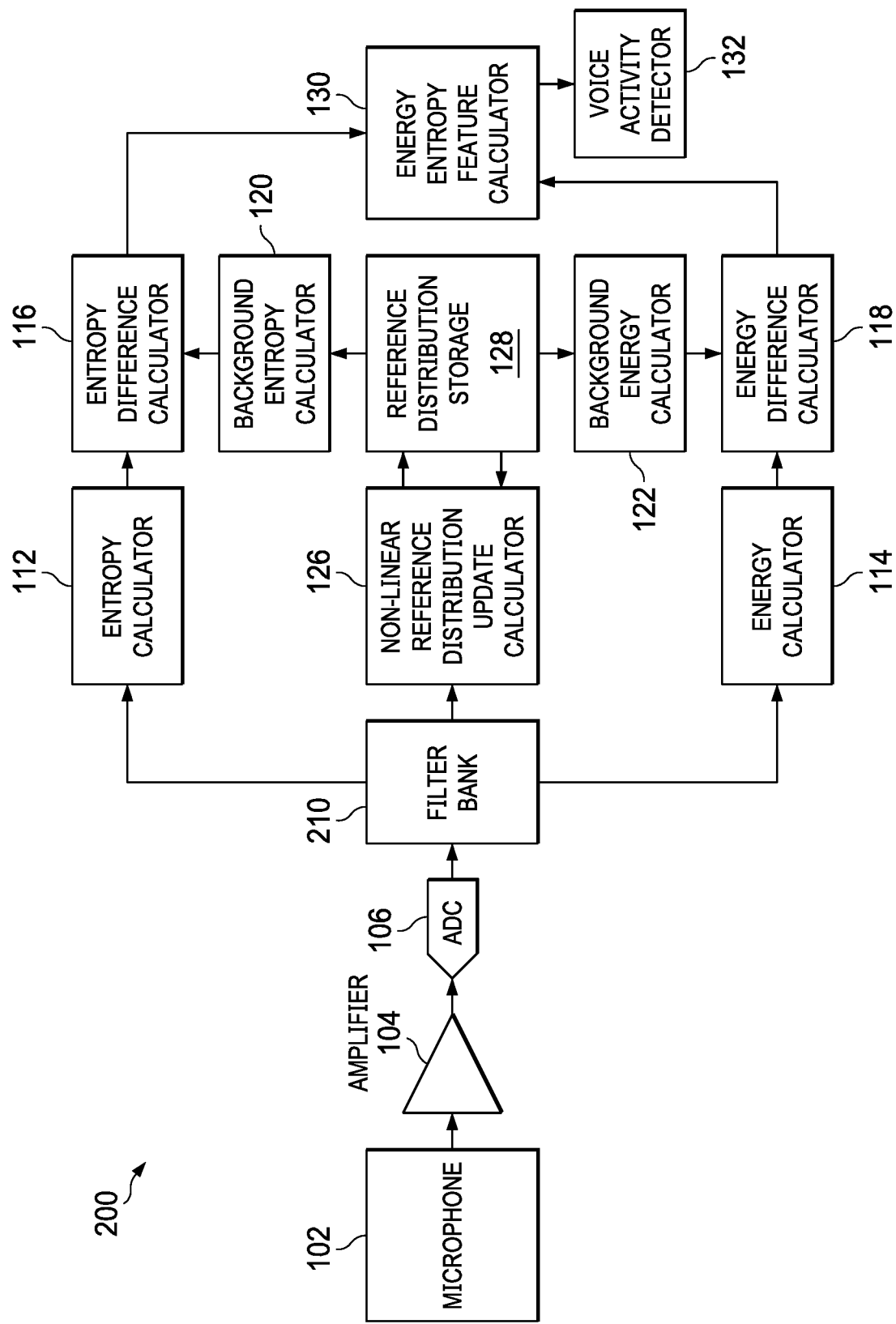
FIG. 2 illustrates an alternative apparatus for performing voice activity detection using a non-linear weighted background noise estimate that includes filter banks in place of a Fourier transform calculator.

Referring to FIG. 2, a block diagram of a second apparatus 200 for performing voice activity detection is shown. The second apparatus 200 corresponds to the apparatus 100 except the second apparatus 200 includes a filter bank 210 in place of the Fourier transform calculator 110 and the second apparatus 200 does not include the window selector 108. Instead, the ADC 106 outputs the digital signal x[n] directly to the filter bank 210. The filter bank 210 corresponds to a plurality of filters configured to output a PSD distribution of a frame. The filter bank applies several finite impulse response filters to the digital signal to separate the digital signal into a set of parallel bands. The impulse responses are denoted by $h_i[n]$, for bands i=1, . . . , R. The output of an individual band filter is given by $y_i[l]=\Sigma_m x[m] h_i[lD-m]$. The filter bank output for frame l is the vector generated by assembling the band filter outputs, $[y_1[l] \ldots y_R[l]]^T$, where the superscript T represents the transpose operation. The power spectral density elements are generated by squaring the elements of the filter bank output vector. Thus, for frame l, the PSD output is given by $S_{l,i}=y_i^2[l]$. Thus, an apparatus that performs voice activity detection may be implemented with a Fourier transform calculator (e.g., software executable by a processor to perform Fourier transforms or hardware configured to perform Fourier transforms) or a filter bank.

Figure 3:
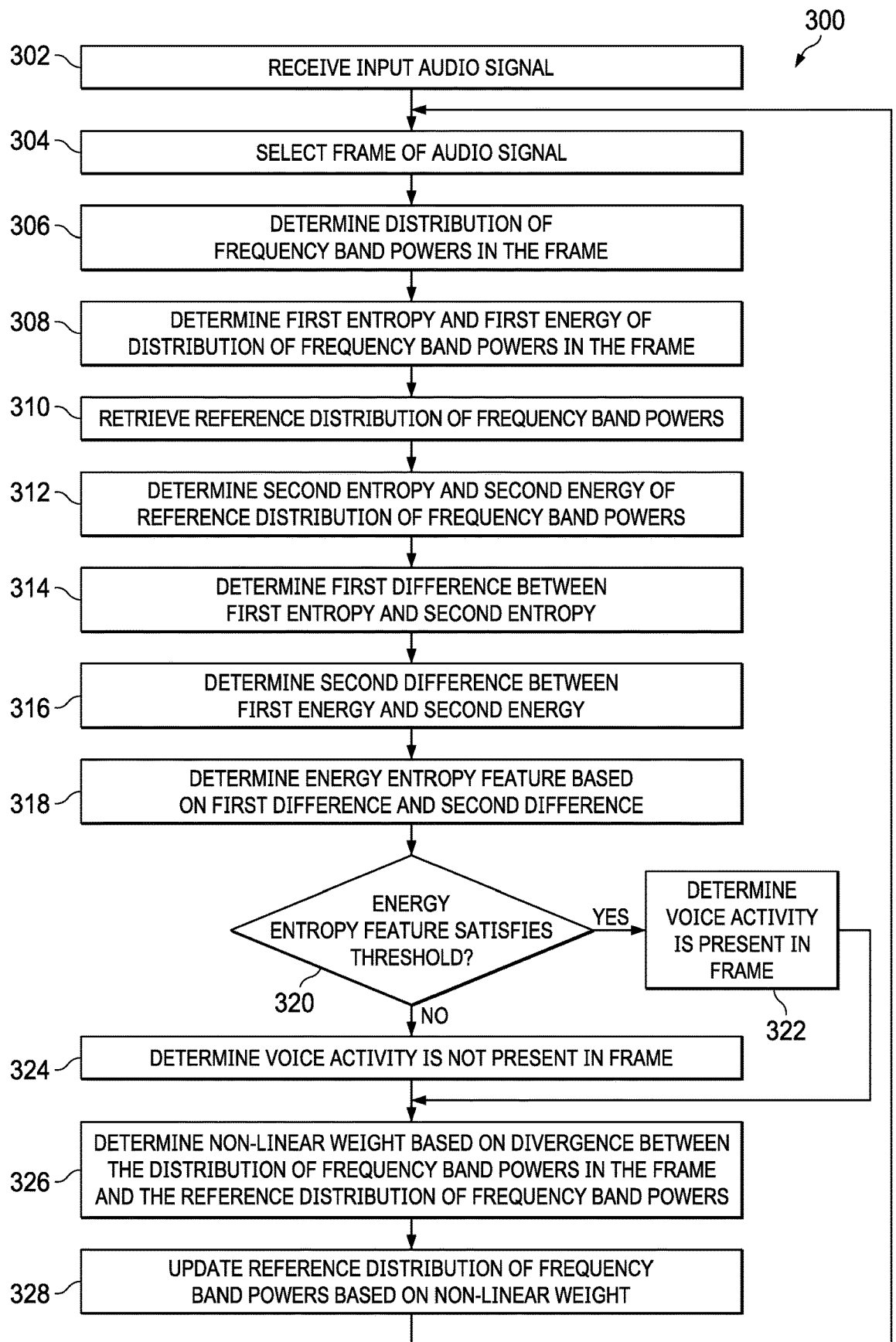
FIG. 3 illustrates a flowchart of a method for performing voice activity detection using a non-linear weighted background noise estimate.

Referring to FIG. 3, a flowchart depicting a method 300 of performing voice activity detection is shown. The method 300 may be performed by a computing device, such as the apparatus 100 of FIG. 1 or the second apparatus 200 of FIG. 2.

The method 300 includes receiving an input audio signal, at 302. For example, the microphone 102 may generate an analog audio signal based on detected sounds, the amplifier 104 may amplify the analog audio signal, and the analog to digital converter 106 may generate a digital audio signal based on the amplified analog signal. The digital audio signal may then be received by the window selector 108.

The method 300 further includes selecting a frame of the audio signal, at 304. For example, the window selector 108 may select a frame of the digital signal output by the ADC 106 using a Hamming window function, such as $x_{w,l}[n]=w[n]x[lB+n]$. In some implementations, the window selector 108 generates windows at random intervals.

The method 300 further includes determining a distribution of frequency band powers in the frame, at 306. For example, the Fourier transform calculator 110 (or the filter bank 210) may output a PSD distribution for the frame according to the equation $S(k, l)=X(k, l)X^*(k, l)$, where X[k, l] is a frequency domain mapping of the frame (l) and the * denotes the complex conjugate operation The frequency domain mapping of the window may be generated by the Fourier transform calculator (or the filter bank 210).

The method 300 further includes determining a first entropy and a first energy of the distribution of frequency band powers in the frame, at 308. For example, the entropy calculator 112 may determine an entropy (H(l)) of the PSD distribution of the frame (l). The entropy calculator 112 may generate the entropy (H(l)) by normalizing the PSD distribution (S(k, l)) of the frame (l) according to the equation $$P(k, l) = \frac{S(k, l)}{\Sigma_k S(k, l)}$$

and calculating $H(l)=-\Sigma_k P(k, l) \log_2 P(k, l)$. Further, the energy calculator 114 may determine an energy (E(l)) of the PSD distribution (S(k, l)) of the frame (l) according to the equation $E(l)=\Sigma_n x_{w,l}^2[n]=\Sigma_k S(k, l)$.

The method 300 further includes retrieving a reference distribution of frequency band powers, at 310. For example, the background entropy calculator 120 and the background energy calculator 122 may retrieve a reference PSD distribution ($S_{noise}(k, l)$) from the reference distribution storage 128. The reference PSD distribution ($S_{noise}(k, l)$) may correspond to an estimated PSD distribution of noise within the frame (l). The reference PSD distribution may be based on a previous frame's PSD distribution. For a first frame, the reference PSD distribution may correspond to a zero vector.

The method 300 further includes determining a second entropy and a second energy of the reference distribution of the frequency band powers, at 312. For example, the background entropy calculator 120 may calculate background entropy ($H_{noise}(l)$) of the frame (l) based on the reference PSD distribution ($S_{noise}(k, l)$), and the background energy calculator 122 may calculate background entropy ($E_{noise}(l)$) of the frame (l) based on the reference PSD distribution ($S_{noise}(k, l)$).

The method 300 further includes determining a first difference between the first entropy and the second entropy, at 314. For example, the entropy difference calculator 116 may determine a difference ($\Delta H(l)$) between the entropy ($H(l)$) of the frame and the background entropy of the frame ($H_{noise}(l)$) according to the equation $\Delta H(l)=|H(l)-H_{noise}(l)|$.

The method 300 further includes determining a second difference between the first energy and the second energy, at 316. For example, the energy difference calculator 118 may determine a difference ($\Delta E(l)$) between the energy ($E(l)$) of the frame and the background energy of the frame ($H_{noise}(l)$) according to the equation $\Delta E(l)=|E(l)-E_{noise}(l)|$.

The method 300 further includes determining an energy entropy feature based on the first difference and the second difference, at 318. For example, the energy entropy feature calculator 130 may determine an energy entropy feature ($F(l)$) based on the entropy difference ($\Delta H(l)$) and the energy difference ($\Delta E(l)$) of the frame according to the equation $F(l)=\sqrt{1+|\Delta H(l)\Delta E(l)|}$.

The method 300 further includes determining whether the energy entropy feature satisfies a threshold, at 320. For example, the voice activity detector 132 may compare the energy entropy feature ($F(l)$) of the frame (l) to determine whether voice activity is present in the frame (l). The voice activity detector 132 may determine that the threshold is satisfied in response to the energy entropy feature ($F(l)$) exceeding the threshold (or being greater than or equal to the threshold). The threshold may be based on the microphone 412, gains of the amplifier 410, a number of bits of the ADC 404, or a combination thereof.

The method 300 further includes determining voice activity is present in the frame, at 302, in response to the energy entropy feature satisfying the threshold or determining that voice activity is not present in the frame, at 324, in response to the energy entropy feature does not satisfying the threshold. For example, the voice activity detector 132 may determine that voice activity is present in the frame (l) in response to the energy entropy feature ($F(l)$) being greater than or equal to the threshold or that no voice activity is present in the frame (l) in response to the energy entropy feature ($F(l)$) being less than the threshold.

The method 300 further includes determining a non-linear weight based on a divergence between the distribution of frequency band powers in the frame and the reference distribution of frequency band powers, at 326. For example, the non-linear reference distribution update calculator 126 may determine a non-linear weight $$\left(\frac{1}{1+D_{KL}(S_{noise}(k, l)\|S(k, l))}\right)$$

based on a Kullback-Leibler divergence ($D_{KL}(S_{noise}(k, l)\|S(k, l))$) between the PSD distribution ($S(k, l)$) of the frame (l) and the reference PSD distribution ($S_{noise}(k, l)$) of the frame (l).

The method 300 further includes updating the reference distribution of frequency band powers based on the non-linear weight, at 328. For example, the non-linear reference distribution update calculator 126 may calculate a reference PSD distribution ($S_{noise}(k, l+1)$) for estimated noise in a subsequent frame (l+1) based on the non-linear weight ($F(l)$). In particular, the non-linear reference distribution update calculator 126 may calculate the reference PSD distribution for the subsequent frame according to the formula $$S_{noise}(k, l+1) = a*S_{noise}(k, l) + (1-a)*\frac{1}{1+D_{KL}(S_{noise}(k, l)\|S(k, l))}*S(k, l).$$

The method 300 further includes selecting a subsequent frame, at 304 and continuing on with the updated reference distribution, at 304. For example, the window selector 108 may select the subsequent frame (l+1) and the subsequent frame (l+1) may be processed as described above with reference to the frame (l) except that the updated reference PSD $S_{noise}(k, l+1)$ is used by the background entropy calculator 120 and the background energy calculator 122 to calculate background entropy and background energy. Thus, the method 300 non-linearly updates background noise estimates based on detected sound. Accordingly, the method 300 of performing voice activity detection may be more accurate in situations in which sudden and inconsistent shifts in sound activity occur. The method 300 may be arranged in a different sequence than illustrated in some implementations.

Figure 4:
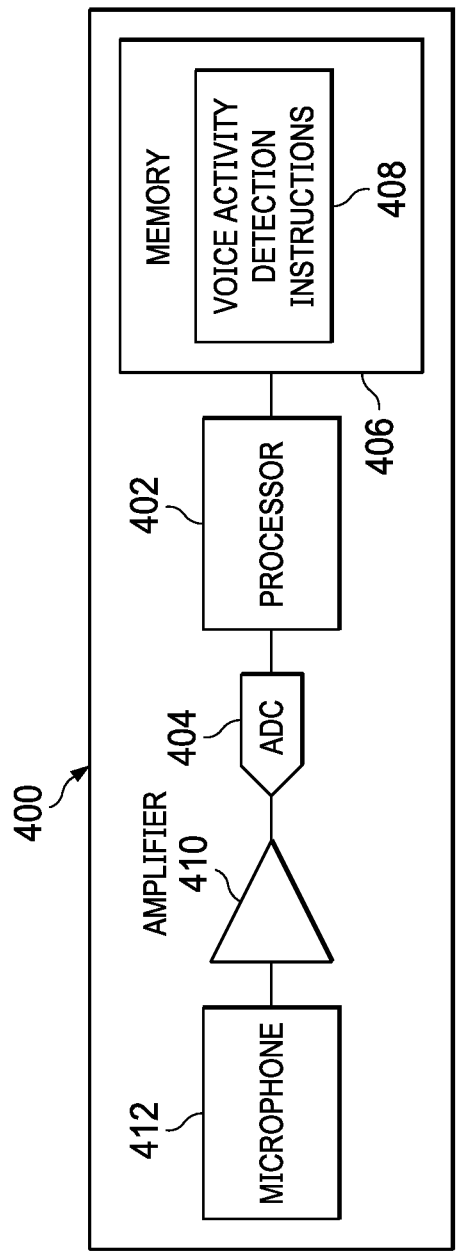
FIG. 4 is a block diagram of an example computing device that may be used to perform voice activity detection using a non-linear weighted background noise estimate.

Referring to FIG. 4, a block diagram of a computing device 400 that may perform voice activity detection is illustrated. In some implementations, the computing device 400 corresponds to the apparatus 100 or the apparatus 200. The computing device 400 includes a processor 402. The processor 402 may include a digital signal processor, a microprocessor, a microcontroller, another type of processor, or a combination thereof.

The computing device further includes a memory 406 connected to the processor 402. The memory 406 includes a computer-readable storage device, such as a read only memory device, a random access memory device, a solid state drive, another type of memory device, or a combination thereof. As used herein, a computer-readable storage device refers to an article of manufacture and not to a transitory signal.

The memory 406 stores voice activity detection instructions 408 executable to perform one or more of the operations described herein with respect to FIGS. 1-3. For example, the voice activity detection instructions 408 may be executable by the processor 402 to perform the method 300.

The computer device 400 further includes an ADC 404 connected to the processor 402. The ADC 404 may correspond to a delta-sigma modulation ADC or to another type of ADC. The ADC 404 may correspond to the ADC 106 of FIGS. 1 and 2.

The computer device 400 further includes an amplifier 410 connected to the ADC 404. The amplifier 410 may include a programmable gain amplifier or to another type of amplifier. The amplifier 410 may correspond to the amplifier 104 of FIGS. 1 and 2.

The computer device 400 further includes a microphone 412 connected to the amplifier 410. The microphone 412 may correspond to the microphone 102 of FIGS. 1 and 2.

In operation, the microphone 412 generates an analog signal based on sound detected in an environment, the amplifier 410 amplifies the analog signal, and the ADC 404 generates a digital signal based on the amplified signal. The processor 402 executes the voice activity detection instructions 408 to perform non-linearly scaling voice activity detection on the digital signal as described herein. Thus, the computing device 400 may be used to provide relatively more accurate voice activity detection as compared to other devices.

The computing device 400 may have alternative configurations in other implementations. These alternative configurations may include additional and/or fewer components. For example, in some implementations, one or more of the microphone 412, the amplifier 410, and the ADC 404 is external to the computing device 400 and the computing device 400 includes an interface configured to receive a signal or data from the ADC 404, the amplifier 410, or the microphone 412. Further, while direct connections are illustrated between components of the computing device 400, in some implementations, the components are connected through a bus or other indirect connection.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method comprising:
   determining a first power spectral density (PSD) distribution of a frame of a signal;
   determining a first reference PSD distribution indicating an estimate of noise in the frame, the determining of the first reference PSD distribution is based on a non-linear weight, a second reference PSD distribution of a previous frame of the signal, and a second PSD distribution of the previous frame;
   determining a first entropy of the first PSD distribution and a second entropy of the first reference PSD distribution;
   determining a first energy of the first PSD distribution and a second energy of the first reference PSD distribution; and
   determining whether voice activity is detected in the frame based on the first entropy, the second entropy, the first energy, and the second energy.

2. The method of claim 1, further comprising determining the non-linear weight based on a divergence between the second PSD distribution and the second reference PSD distribution.

3. The method of claim 2, wherein the divergence corresponds to a Kullback-Leibler divergence.

4. The method of claim 3, wherein the non-linear weight is determined according to an equation equal to $$\frac{1}{1+D_{KL}(S_{noise}(k,l)\|S(k,l))}$$

where $D_{KL}(S_{noise}(k,l)\|S(k,l))$ is the Kullback-Leibler divergence between the reference PSD distribution ($S_{noise}(k,l)$) for the frame and the PSD distribution ($S(k,l)$) for the frame and a is a weight term between 0 and 1.

5. The method of claim 1, wherein the signal is an audio signal.

6. The method of claim 1, further comprising:
   determining an energy difference ($\Delta E$) between the first energy and the second energy;
   determining an entropy difference ($\Delta H$) between the first entropy and the second entropy; and
   determining an energy entropy feature based on the energy difference and the entropy difference, wherein determining whether voice activity is detected in the frame based on the first entropy, the second entropy, the first energy, and the second energy includes determining whether the energy entropy feature satisfies a threshold.

7. The method of claim 6, wherein the energy entropy feature is equal to $\sqrt{1+|\Delta E \Delta H|}$.

8. The method of claim 1, further comprising generating the frame using a Hamming window function.

9. A device comprising:
   a processor; and
   a memory storing instructions executable by the processor to:
      determine a first power spectral density (PSD) distribution of a frame of a signal;
      generate a first reference PSD distribution indicating an estimate of noise in the frame, the determining of the first reference PSD distribution is based on a non-linear weight, a second reference PSD distribution of a previous frame of the signal, and a second PSD distribution of the previous frame;
      determine a first entropy of the first PSD distribution and a second entropy of the first reference PSD distribution;
      determine a first energy of the first PSD distribution and a second energy of the first reference PSD distribution; and
      determine whether voice activity is detected in the frame based on the first entropy, the second entropy, the first energy, and the second energy.

10. The device of claim 9, wherein the instructions are further executable by the processor to determine the non-linear weight based on a divergence between the second PSD distribution and the second reference PSD distribution.

11. The device of claim 10, wherein the divergence corresponds to a Kullback-Leibler divergence.

12. The device of claim 11, wherein the non-linear weight is determined according to an equation equal to $$\frac{1}{1+D_{KL}(S_{noise}(k,l)\|S(k,l))}$$

where $D_{KL}(S_{noise}(k,l)\|S(k,l))$ is the Kullback-Leibler divergence between the reference PSD distribution ($S_{noise}(k,l)$) for the frame and the PSD distribution ($S(k,l)$) for the frame and a is a weight term between 0 and 1.

13. The device of claim 9, wherein the signal is an audio signal.

14. The device of claim 9, wherein the instructions are further executable by the processor to:
   determine an energy difference ($\Delta E$) between the first energy and the second energy;
   determine an entropy difference ($\Delta H$) between the first entropy and the second entropy; and determine an energy entropy feature based on the energy difference and the entropy difference, wherein determining whether voice activity is detected in the frame based on the first entropy, the second entropy, the first energy, and the second energy includes determining whether the energy entropy feature satisfies a threshold.

15. The device of claim 14, wherein the energy entropy feature is equal to $\sqrt{1+|\Delta E \Delta H|}$.

16. The device of claim 9, wherein the instructions are further executable by the processor to generate the frame using a Hamming window function.

17. A computer readable storage device storing instructions executable by a processor to:
    determine a first power spectral density (PSD) distribution of a frame of a signal;
    generate a first reference PSD distribution indicating an estimate of noise in the frame, the determining of the first reference PSD distribution is based on a non-linear weight, a second reference PSD distribution of a previous frame of the audio signal, and a second PSD distribution of the previous frame;
    determine a first entropy of the first PSD distribution and a second entropy of the first reference PSD distribution;
    determine a first energy of the first PSD distribution and a second energy of the first reference PSD distribution; and
    determine whether voice activity is detected in the frame based on the first entropy, the second entropy, the first energy, and the second energy.

18. The computer readable storage device of claim 17, wherein the instructions are further executable by the processor to determine the non-linear weight based on a divergence between the second PSD distribution and the second reference PSD distribution.

19. The computer readable storage device of claim 18, wherein the divergence corresponds to a Kullback-Leibler divergence.

20. The computer readable storage device of claim 19, wherein the non-linear weight is determined according to an equation equal to $$\frac{1}{1+D_{KL}(S_{noise}(k,l)\|S(k,l))}$$

where $D_{KL}(S_{noise}(k,l)\|S(k,l))$ is the Kullback-Leibler divergence between the reference PSD distribution ($S_{noise}(k,l)$) for the frame and the PSD distribution ($S(k,l)$) for the frame and a is a weight term between 0 and 1.

21. The computer readable storage device of claim 17, wherein the signal is an audio signal.

22. The computer readable storage device of claim 17, wherein the instructions are further executable by the processor to:
    determine an energy difference ($\Delta E$) between the first energy and the second energy;
    determine an entropy difference ($\Delta H$) between the first entropy and the second entropy; and
    determine an energy entropy feature based on the energy difference and the entropy difference, wherein determining whether voice activity is detected in the frame based on the first entropy, the second entropy, the first energy, and the second energy includes determining whether the energy entropy feature satisfies a threshold.

23. The computer readable storage device of claim 22, wherein the energy entropy feature is equal to $\sqrt{1+|\Delta E \Delta H|}$.

24. A method comprising:
    determining a first power spectral density (PSD) distribution of a frame of an audio signal;
    determining a first reference PSD distribution indicating an estimate of noise in the frame, the determining of the first reference PSD distribution is based on a non-linear weight, a second reference PSD distribution of a previous frame of the audio signal, and a second PSD distribution of the previous frame;
    determining a first entropy of the first PSD distribution and a second entropy of the first reference PSD distribution;
    determining a first energy of the first PSD distribution and a second energy of the first reference PSD distribution;
    determining an energy difference between the first energy and the second energy;
    determining an entropy difference between the first entropy and the second entropy;
    determining an energy entropy feature based on the energy difference and the entropy difference; and determining whether voice activity is detected in the frame based on whether the energy entropy feature satisfies a threshold.

25. A device comprising:
    a processor; and
    a memory storing instructions executable by the processor to:
    determine a first power spectral density (PSD) distribution of a frame of an audio signal;
    generate a first reference PSD distribution indicating an estimate of noise in the frame, the determining of the first reference PSD distribution is based on a non-linear weight, a second reference PSD distribution of a previous frame of the audio signal, and a second PSD distribution of the previous frame;
    determine a first entropy of the first PSD distribution and a second entropy of the first reference PSD distribution;
    determine a first energy of the first PSD distribution and a second energy of the first reference PSD distribution;
    determine an energy difference between the first energy and the second energy;
    determine an entropy difference between the first entropy and the second entropy; and
    determine an energy entropy feature based on the energy difference and the entropy difference; and
    determine whether voice activity is detected in the frame based on whether the energy entropy feature satisfies a threshold.

* * * * *